Dec. 31, 1940.     J. BERGER ET AL     2,226,702

TOOL FOR FIXING HOSE UNIONS

Filed Feb. 20, 1939

Inventor

Julius Berger
Rudolf Kaiser

By *Strauch & Hoffman*
Attorneys

Patented Dec. 31, 1940

2,226,702

UNITED STATES PATENT OFFICE 2,226,702

TOOL FOR FIXING HOSE UNIONS

Julius Berger, Berlin-Wilhelmsruh, and Rudolf Kaiser, Berlin-Hohenneuendorf, Germany, assignors to Michigan Patents Corporation, Jackson, Mich.

Application February 20, 1939, Serial No. 257,528
In Germany September 3, 1936

1 Claim. (Cl. 29—88.2)

The present invention relates to a tool for fixing hose unions of the type comprising a hose fitting and a nipple provided with a cap nut, said nipple having an interior diameter equal to that of the hose and being provided with a sealing cone as well as the thread adapted to cooperate with the tool.

In hose unions of the kind mentioned above, it is desired to keep the internal diameter of the nipple equal to the internal diameter of the hose, but for various reasons this hardly is possible. For instance, hose unions can only be assembled with great difficulties or the wall of the hose is excessively stressed at the clamping place which leads to the hose breaking away.

The invention now relates to a tool which is intended for use with hose unions of the kind above described and enables the union to be put together in a very simple and secure manner.

A tool serving this purpose and constructed according to the invention is characterized substantially in this that it comprises in combination a handle part and a mandrel fixed to said handle part and adapted to fit in the inner nipple so as to extend through it and project beyond its end, a friction surface being provided on the tool for engaging one of the sealing surfaces of the nipple in order to establish a temporary frictional connection with the said surface.

In the accompanying drawing the invention is shown by way of example.

Figure 1:
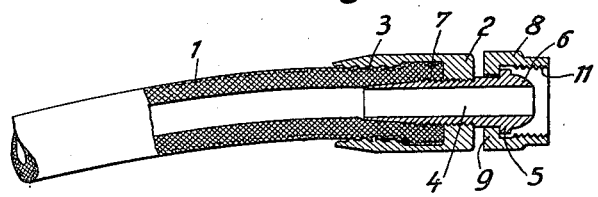
Figure 2:
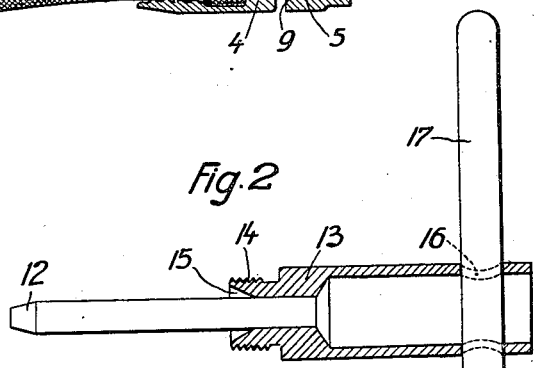
Figure 3:
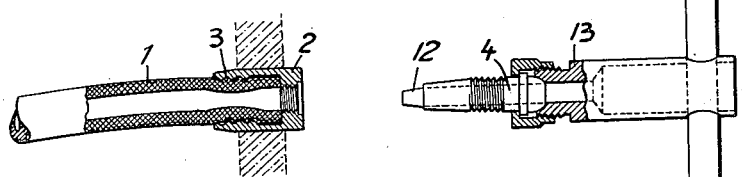
Figure 4:
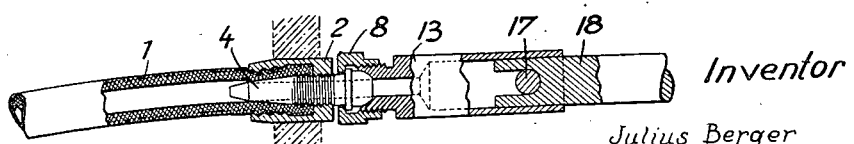

In this drawing:

Fig. 1 is a longitudinal section through a hose union according to the invention, Fig. 2 shows a section through the tool according to the invention for introducing the nipple into the end of the hose, Fig. 3 is a view showing the use of the tool when inserting the nipple, and Fig. 4 shows a view, partly in section, of a hose union with the tool after the assembling of the hose union.

The hose 1, shown in Fig. 1, which for instance represents the end of a length of piping, is to be provided with a metallic head which will allow of it being connected to a pipe nipple or the like. For this purpose there is placed over the hose end the hose socket 2 in the form of a piece of tubing which is inwardly thickened at its forward end and the extension of which is provided with an internal thread 3. Into the hose socket 2 and the hose end 1 is screwed a nipple 4 which has at its forward end a flange 5 and a conical sealing surface 6. This nipple is provided with an external thread 7 which fits a corresponding internal thread in the thickened head end of the hose socket 2. The internal diameter of the nipple 4 is the same throughout its entire length and corresponds to the internal diameter of the hose 1. The external diameter of the nipple, however, becomes gradually smaller in the direction towards the hose, so that the walls of the nipple taper to a thin edge.

A cap nut 8 engages with an inwardly projecting flange 9 behind the flange 5 of the nipple 4. By means of the thread 11 of the cap nut 8 the hose 1 may be connected with a pipe provided with an external thread, in such a manner that the sealing surface 6 of the nipple 4 will be pressed against the correspondingly formed end surface of the piece of piping.

The putting together of a hose union shown in Fig. 1 is very difficult, as the hose end which is to be pressed between the hose socket and the inner nipple offers a considerable resistance to the insertion of the inner nipple and the hose end will again and again move out of its socket.

The tool illustrated in Fig. 2 overcomes this difficulty. The tool consists of a mandrel 12 which is held in a socket 13. This socket is provided at its end with an external thread 14 which fits the thread 11 of the cap nut 8. The socket 13 also has at its end a sealing surface 15 which corresponds to the sealing cone 6 of the nipple 4. That end of the socket 13 which is remote from the mandrel 12 must be provided with a handle for enabling the mandrel to be turned. For this purpose a tommy bar 17 is inserted with a tight fit into the holes 16 of the tubular end of the socket.

Fig. 3 shows how the tool is used when the union is to be put together. In the first place the hose socket 2 is placed over the hose end. This causes the internal diameter of the hose to be reduced in a manner corresponding to the peculiar form of the thread 3, the convolutions of which are highest in the middle of the whole extent of the thread and flatten off towards both ends.

This feature is important for the reason to be given hereinafter.

The cap nut 8 is then screwed together with the nipple 4 on to the mandrel 12, until the sealing surface 15 on the tool and the sealing cone 6 on the nipple 4 are pressed firmly against one another. Through the parts being thus pressed firmly against one another the nipple 4 will be carried round by friction, when the tool is turned. On the tool with the cap nut 8 and the nipple 4 thereupon being pushed into the hose end which has been prepared as in Fig. 3, the tapering mandrel 12 will force the interior of the hose apart, so that the nipple 4 can be inserted and the hose walls be further compressed. The peculiar form of the thread convolutions 3 already provides an increased security against the hose being forced out of the socket 4. The thread 7 on the nipple 4 and the thread 11 of the cap nut 8 are both right-handed. On the tool being turned to the right, the separate parts will therefore gradually assume the position shown in Fig. 4. This is further facilitated through the internal thread of the socket 2 being left-handed so that, should the hose be turned with the nipple 4, the connection between the hose and the hose socket 2 will only become more intimate.

For enabling the nipple 4 to be introduced into the hose end and screwed on the mandrel 12 more easily, it is important for the nipple to be provided on the outside with a lubricant. The best lubricant for this purpose is graphite paste.

When the position shown in Fig. 4 has been reached, the tool is first released from the cap nut 8 by holding the cap nut and turning the tool to the left, so that the mandrel 12 can then be simply withdrawn from the nipple 4.

In Fig. 4 a further advantageous way of using the tool 13 is shown. A piece of iron or a shaft 18 provided with a claw may be introduced into the tubular end of the tool, so that the hose may be connected up by turning the shaft 18.

The shape of the thread 3 in the socket 2 has the further advantage that the hose 1 retains its flexibility right up to the edge of the socket 2 without its walls being excessively stressed. This advantage is due both to the circumstance that the clamping pressure gradually ceases and that the end of the nipple 4 lies back from the end of the hose socket 2.

What we claim is:

A tool for connecting a hose and a coupling of the type which has a nipple at one end that is adapted to be forced into the end of a hose of smaller diameter than the nipple, an annular sealing surface at the other end, and a screw connection adapted for connecting the sealing surfaces in sealing contact with a mating coupling element, said tool comprising a mandrel adapted to extend through the nipple and project beyond the entering end of the nipple, the projecting portion of the mandrel at one end of the nipple having a tapered surface for expanding the hose and feeding the nipple into the hose, a transverse annular smooth surface on the mandrel at the other end of the nipple adapted to engage the sealing surface of the nipple without injury, a screw threaded surface adjacent the annular smooth surface for threaded engagement with the screw connection of the nipple whereby to tightly engage the sealing surface of the nipple with the annular smooth surface of the tool and thereby secure the coupling to the tool during operation thereof, and means on said mandrel for operating the same.

JULIUS BERGER.
RUDOLF KAISER.